(12) United States Patent
Baba

(10) Patent No.: US 8,286,783 B2
(45) Date of Patent: Oct. 16, 2012

(54) PALLET CONVEYING APPARATUS AND PALLET CONVEYANCE METHOD

(75) Inventor: Junichiro Baba, Fukusima (JP)

(73) Assignee: Nittoku Engineering Co. Ltd., Saitama-Ken (JP)

( * ) Notice: Subject to any disclaimer, the term of this patent is extended or adjusted under 35 U.S.C. 154(b) by 361 days.

(21) Appl. No.: 12/766,033

(22) Filed: Apr. 23, 2010

(65) Prior Publication Data

US 2011/0100783 A1 May 5, 2011

(30) Foreign Application Priority Data

Oct. 29, 2009 (JP) ................................. 2009-248398

(51) Int. Cl.
*B65G 21/12* (2006.01)

(52) U.S. Cl. .......................... 198/597; 198/605; 198/606

(58) Field of Classification Search .................. 198/597, 198/605, 606
See application file for complete search history.

(56) References Cited

U.S. PATENT DOCUMENTS

| | | | | |
|---|---|---|---|---|
| 3,250,375 A | * | 5/1966 | Bonthuis et al. | 198/460.3 |
| 4,003,461 A | * | 1/1977 | Speaker et al. | 198/597 |
| 4,135,619 A | * | 1/1979 | Cerboni | 198/471.1 |
| 4,591,046 A | * | 5/1986 | Toste et al. | 198/457.07 |
| 4,722,432 A | * | 2/1988 | Staton | 198/471.1 |
| 4,747,193 A | * | 5/1988 | Hashidate et al. | 29/33 P |
| 5,630,309 A | * | 5/1997 | Blidung et al. | 53/443 |
| 6,191,507 B1 | * | 2/2001 | Peltier et al. | 310/12.02 |
| 6,591,476 B2 | * | 7/2003 | DeCecca et al. | 29/464 |
| 7,108,122 B2 | * | 9/2006 | Boriani et al. | 198/468.8 |
| 7,513,357 B2 | * | 4/2009 | Abbestam et al. | 198/457.03 |
| 7,810,635 B2 | * | 10/2010 | Kim et al. | 198/817 |
| 8,141,766 B1 | * | 3/2012 | Wei et al. | 228/43 |
| 2005/0061193 A1 | | 3/2005 | Rothbauer et al. | |
| 2007/0028795 A1 | | 2/2007 | Parati | |

FOREIGN PATENT DOCUMENTS

AT 202929 B 4/1959
(Continued)

OTHER PUBLICATIONS

US. 4,883,463, Gamberini et al. Withdrawn.*

*Primary Examiner* — Douglas Hess
(74) *Attorney, Agent, or Firm* — Laurence A. Greenberg; Werner H. Stemer; Ralph E. Locher

(57) ABSTRACT

Conveyance pitch is modified without modifying a pallet. A pallet conveying apparatus has: one, two or more pallets onto which a work can be loaded; a first and a second pallet rails on which the pallet can be movably loaded; first and second pallet feeding mechanisms that convey the pallet; and a pallet transfer mechanism that causes the pallet loaded on the first or second pallet rail to be transferred to the second or first pallet rail. The pallet transfer mechanism has a first movable portion that forms one part of the first pallet rail and that can be made continuous with the second pallet rail by being separated from another part; and a second movable portion that forms one part of the second pallet rail and that can be made continuous with the first pallet rail by being separated from another part. The first and second pallet feeding mechanisms have circulating endless first and second belts capable of engaging with the pallet that is loaded on each of the pallet rails.

3 Claims, 11 Drawing Sheets

FOREIGN PATENT DOCUMENTS

| | | |
|---|---|---|
| EP | 1746052 A1 | 1/2007 |
| JP | 64028109 A | 1/1989 |
| JP | 03264229 A | 11/1991 |
| JP | 05043043 A | 2/1993 |
| JP | 2001006961 A | 1/2001 |
| JP | 2007021629 A | 2/2007 |

* cited by examiner ated2009-248398, filed Oct. 29, 2009; the prior application is herewith incorporated by reference in its entirety.

PALLET CONVEYING APPARATUS AND PALLET CONVEYANCE METHOD

CROSS-REFERENCE TO RELATED APPLICATION

This application claims the priority, under 35 U.S.C. §119, of Japanese application JP 2009-248398, filed Oct. 29, 2009; the prior application is herewith incorporated by reference in its entirety.

BACKGROUND OF THE INVENTION

Field of the Invention

The present invention relates to a pallet conveying apparatus and pallet conveyance method in which one, two or more pallets, having works placed thereon, are conveyed to a machine tool, along a predetermined track.

Conventional production lines comprise, for instance, conveyance equipment in which works are conveyed, by way of conveyors, to destination machine tools in which the works are processed. Such conventional conveyance equipment, however, has drawbacks in that when a heavy work such as a stator or the like is loaded on a conveyor, to be conveyed on the latter, the substantial inertia of the work at rest makes conveyance speed harder to increase, and renders accurate positioning, via stoppers, more difficult.

In order to overcome the above drawbacks, the applicants have proposed a pallet conveying apparatus (for instance, Japanese Patent Application Laid-open No. 2007-21629), in which a plurality of work-carrying pallets are conveyed to machine tools over square tracks. The conveying apparatus comprises a back pallet rail and a front pallet rail that extend parallel to each other; a left pallet rail and a right pallet rail that can be made continuous with the end portions of the back pallet rail front pallet rail, by being moved between two respective positions that face of two ends of the back pallet rail and the front pallet rail; and a left pallet feeding mechanism and a right pallet feeding mechanism that move the pallets backward and forward along the back pallet rail or the front pallet rail. The pallets are gripped and conveyed between the left pallet feeding mechanism and the right pallet feeding mechanism. Conveyance speed and positioning accuracy of the works can potentially be increased by causing the pallets to be gripped and conveyed thus between the left pallet feeding mechanism and right pallet feeding mechanism.

Since in the above pallet conveying apparatus the pallets are gripped and conveyed between the left pallet feeding mechanism and right pallet feeding mechanism, however, the pitch between the gripped pallets is limited to the total length of the pallets in the conveyance direction. To change the pitch, thus, all the pallets must be replaced by pallets having a different total length. Such lack of flexibility as regards pitch modification remains an unresolved problem.

SUMMARY OF THE INVENTION

It is thus an object of the present invention to provide a pallet conveying apparatus and a pallet conveyance method that allow modifying conveyance pitch without modifying the pallets.

The present invention is an improvement of a pallet conveying apparatus that comprises one, two or more pallets onto which a work can be loaded; a first pallet rail and a second pallet rail onto which the pallet can be movably loaded; a first pallet feeding mechanism and a second pallet feeding mechanism that convey the pallet along the first pallet rail and the second pallet rail; and a pallet transfer mechanism that causes the pallet loaded on the first pallet rail or the second pallet rail to be transferred to the second pallet rail or the first pallet rail.

In the above configuration, the first pallet feeding mechanism has an endless first belt that is capable of engaging with the pallet that is loaded on the first pallet rail, and circulates along the first pallet rail; the second pallet feeding mechanism an endless second belt that is capable of engaging with the pallet that is loaded on the second pallet rail, and circulates along the second pallet rail; and the pallet transfer mechanism has a first movable portion that forms one part of the first pallet rail and that can be made continuous with the second pallet rail by moving away from another part of the first pallet rail; and a second movable portion that forms one part of the second pallet rail and that can be made continuous with the first pallet rail by moving away from another part of the second pallet rail.

In this case, preferably, the first and second belts are toothed belts having recesses/projections extending in the width direction and alternately continuous in the longitudinal direction; counter-recesses/projections capable of engaging with the recesses/projections are formed in the pallet; the pallet is conveyed along the first or second pallet rail, by circulating the belt, with the counter-recesses/projections being engaged with the recesses/projections; and the pallet disengages from the first or second belt when the first or second movable portion of the first or second pallet rail, on which the pallet is loaded, moves away from another part of the first or second movable portion.

When the total length of the first and second pallet rails is comparatively large, one or both of the first and second belts may comprise a pair of endless circulating toothed short belts; and the pair of toothed short belts may have a single driving pulley on which each of the toothed short belts is wrapped; the pair of toothed short belts can circulate through rotation of the single driving pulley.

In another aspect, the present invention is an improvement of a pallet conveyance method that comprises a first pallet conveying step of conveying a pallet along a first pallet rail; a first pallet transfer step of separating one part of the first pallet rail onto which the pallet is loaded from another part, and transferring the pallet to a second pallet rail; a second pallet conveying step of conveying the pallet along the second pallet rail; a second pallet transfer step of separating one part of the second pallet rail, onto which the pallet is loaded, from another part, and transferring the pallet to the first pallet rail.

In the first pallet conveying step and the second pallet conveying step of the above method, the pallet is conveyed by engaging the pallet with an endless belt that circulates along the first pallet rail and the second pallet rail; and in the first pallet transfer step and the second pallet transfer step, the pallet, loaded on one part of the first pallet rail or the second pallet rail, is disengaged from the belt upon separation of the one part from another part.

In the pallet conveying apparatus and pallet conveyance method of the present invention, a pallet can be conveyed along a first pallet rail and a second pallet rail through engaging of the pallet with an endless circulating belt. Modifying the position at which the pallet engages with the belts allows modifying easily the conveyance pitch with respect to a pallet ahead, i.e. the spacing with respect to a pallet that has engaged previously with the belt and has been conveyed along the first pallet rail or the second pallet rail, without modifying the pallets themselves.

Other features which are considered as characteristic for the invention are set forth in the appended claims.

Although the invention is illustrated and described herein as embodied in a pallet conveying apparatus and pallet conveyance method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Preferred embodiments of the present invention are explained next on the basis of accompanying drawings.

Figure 1:
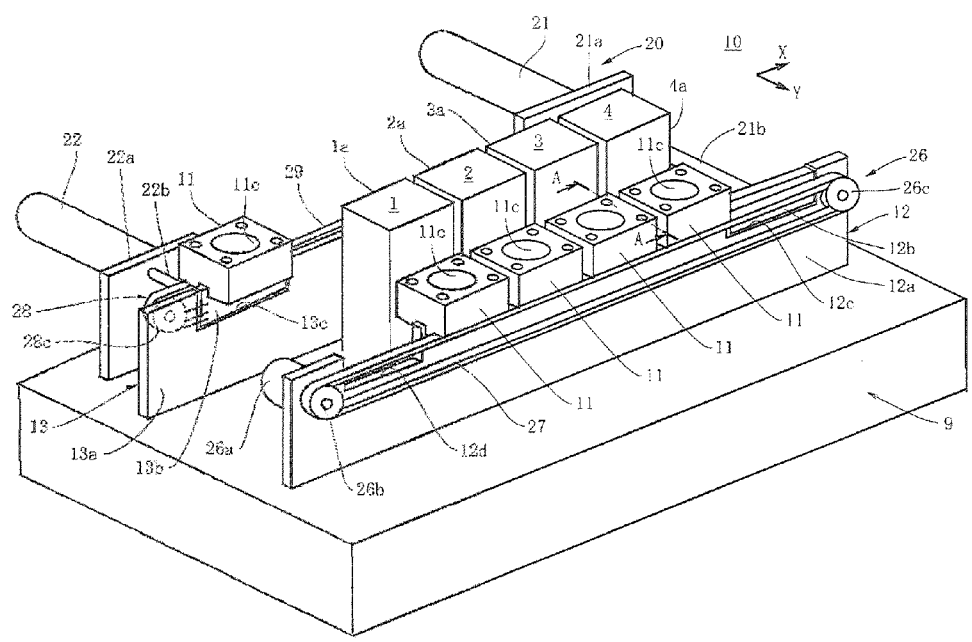
FIG. 1 is a perspective-view diagram illustrating a pallet conveying apparatus according to an embodiment of the present invention.

FIG. 1 illustrates a pallet conveying apparatus 10 according to the present invention. In the figures there are set two axes X, Y perpendicular to each other, such that the X-axis extends substantially in a horizontal lateral direction and the Y-axis extends substantially in a horizontal front-rear direction. The explanation of the features of the pallet conveying apparatus 10 is referred to these two axes.

Figure 6:
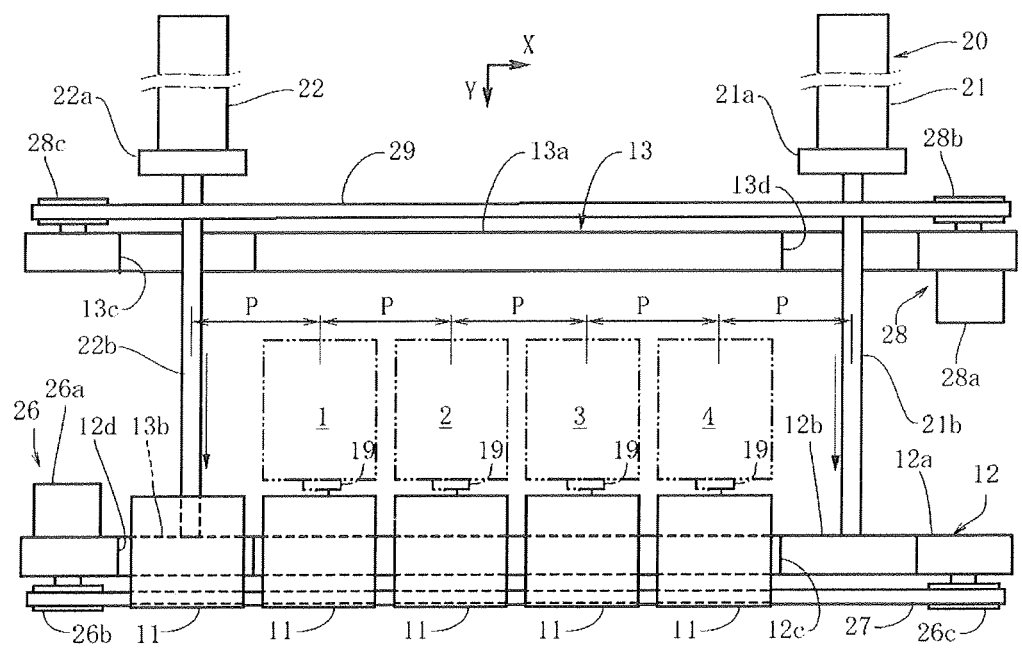
FIG. 6 is top-view diagram illustrating a state prior to conveyance of the pallet along the first pallet rail.

In the example illustrated herein, the pallet conveying apparatus 10 of the present embodiment is installed in a production line, for instance, of electric motor stators. In this production line, four machine tools 1 to 4 are arranged in a row at a predetermined pitch P in the X-axis direction (FIG. 6). In the figures, the reference numerals 1a to 4a denote stands, disposed in a row at a predetermined pitch P, on which the respective machine tools 1 to 4 are placed. The machine tools 1 to 4 manufacture automatically stators, not shown, through various sequential processes, for instance, insertion of insulating members, crimping of lead wires of coils of respective phases, welding and so forth, and which are performed on works, not shown, that are conveyed by the pallet conveying apparatus 10. The pallet conveying apparatus 10 causes a plurality of pallets 11 to circulate (FIG. 1 illustrates an instance of five pallets), such that works are conveyed to the machine tools 1 to 4 by way of respective pallets 11. The works, not shown, are held at predetermined positions during processing by the respective machine tools 1 to 4. The number of pallets 11 is not limited, and may be arbitrarily greater or smaller, depending on the number of machine tools 1 to 4.

Figure 2:
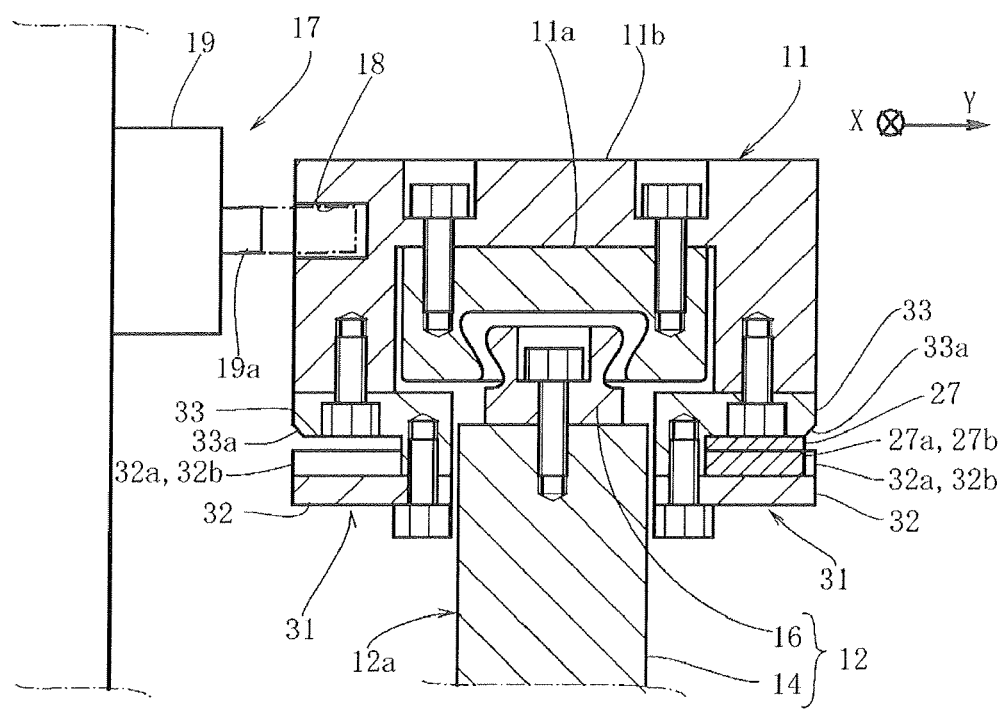
FIG. 2 is a cross-sectional diagram of FIG. 1 along line A-A.

The pallet conveying apparatus 10 comprises a first pallet rail 12 and a second pallet rail 13 that are provided extending parallel to each other on the base 9, in such a manner that the first pallet rail 12 and the second pallet rail 13 flank the machine tools 1 to 4 on both sides thereof, in the Y-axis direction. That is, the pallet conveying apparatus 10 comprises the first pallet rail 12, provided extending in the X-axis direction, on the near side of the machine tools 1 to 4 in the Y-axis direction, and the second pallet rail 13, provided extending in the X-axis direction, on the far side of the machine tools 1 to 4 in the Y-axis direction. The first and second pallet rails 12, 13 have the same structure. As illustrated in FIG. 2, the rails 12, 13 comprise each a support plate 14 that is fixed directly to the base 9, and a commercially-available linear motion guide rail 16 screwed fast to the upper end of the support plate 14 (FIG. 2 illustrates the linear motion guide rail 16 of the first pallet rail).

The pallets 11 comprise each a linear motion block 11a, straddling the linear motion guide rail 16 and configured so as to be movable over the rail 16; a seat 11b screwed to the block 11a; and locking members 31, provided below the seat 11b, and which flank the rail 12 from both sides of the latter. Preferably, the linear motion block 11a is commercially sourced forming a pair with the linear motion guide rail 16, and comprises a roller retainer, not shown. The use of a linear motion block 11a having a roller retainer allows reducing significantly the resistance to motion of the pallets 11 on the first and second pallet rails 12, 13, while restricting motion of the pallets 11 in the width direction (Y-axis direction). The pallets 11 are thus movably loaded on the first and second pallet rails 12, 13. The seat 11b in each pallet 11 is formed in such a manner that the length L thereof in the X-axis direction (FIG. 3) is identical to or shorter than the pitch P (FIG. 6) at which the machine tools 1 to 4 are disposed. A work support section 11c (FIG. 1) that accommodates a work, not shown, is formed in the upper central portion of the pallet 11. The pallet conveying apparatus 10 is configured so as to allow the pallets 11 to stand, all simultaneously, opposite respective machine tools 1 to 4, from the near side in the Y-axis direction, when the plurality of pallets 11, having respective works loaded thereon, moves along the first pallet rail 12, with the pallets 11 spaced apart from each other by a predetermined pitch P. The locking members 31 are explained in detail further on.

As illustrated in FIG. 2, the pallet conveying apparatus 10 comprises a pallet motion locking mechanism 17 that restricts motion of the pallets 11 that face the machine tools 1 to 4. The pallet motion locking mechanism 17 comprises a locking hole 18 extending in the Y-axis direction, and formed in each pallet 11, such that each locking hole 18 faces a respective stand 1a to 4a (FIG. 1) of the machine tools 1 to 4; and a fixing cylinder 19 provided in each of the stands 1a to 4a (FIG. 1) of the machine tools 1 to 4. Each fixing cylinder 19 accommodates a projectable and retractable pin 19a that is inserted into a respective locking hole 18. A controller, not shown, causes the fixing cylinder 19 to extend, whereby the pin 19a becomes inserted into the locking hole 18, as indicated by the dot-dashed line, whereupon the motion of the pallet 11 in the X-axis direction is locked. Retraction of the fixing cylinder 19, by contrast, causes the pin 19a to pull out of the locking hole 18, whereupon the pallet 11 can move freely again.

As illustrated in FIG. 1, the first and second pallet rails 12, 13 have immobile fixed portions 12a, 13a fixed to the base 9, and first and second movable portions 12b, 13b that are not fixed to the base 9 and can hence move. Specifically, storing cutouts 12c, 13c are formed at respective portions of the first and second pallet rails 12, 13 of the present embodiment and the first and second movable portions 12b, 13b are provided so as to occupy the storing cutouts 12c, 13c. The first and second movable portions 12b, 13b are supported by below-described first and second air cylinders 21, 22. The pallet rails 12, 13 are configured in such a manner that when the first and second movable portions 12b, 13b occupy the storing cutouts 12c, 13c, the first and second movable portions 12b, 13b extend linearly in the X-axis direction continuously to the fixed portions 12a, 13a, which are the other parts of the pallet rails 12, 13. The length W (FIG. 3) of the storing cutouts 12c, 13c in the X-axis direction is formed so as to be identical to or longer than the length L of the pallets 11 in the X-axis direction, so that the pallets 11 transferred from the fixed portions 12a, 13a, which are the other parts of the pallet rails 12, 13, can be loaded on the first and second movable portions 12b, 13b that occupy the storing cutouts 12c, 13c.

The pallet conveying apparatus 10 has a pallet transfer mechanism 20 that causes the pallets 11 loaded on the first pallet rail 12 or the second pallet rail 13, to be transferred to the second pallet rail 13 or the first pallet rail 12. The pallet transfer mechanism 20 comprises the first movable portion 12b in the above-described first pallet rail 12, the second movable portion 13b in the second pallet rail 13, and the first and second air cylinders 21, 22 that support individually the movable portions 12b, 13b.

As illustrated in FIGS. 3 to 6, receiving cutouts 12d, 13d, which extend parallel to each other in the X-axis direction, are provided in the first and second pallet rails 12, 13, respectively. The receiving cutout 12d of the first pallet rail 12 is formed so as to oppose the storing cutout 13c of the second pallet rail 13. The receiving cutout 13d of the second pallet rail 13 is formed so as to oppose the storing cutout 12c of the first pallet rail 12. The first pallet rail 12 and the second pallet rail 13 are fixed to the base 9 (FIG. 1) in such a manner that the storing cutouts 12c, 13c and the receiving cutouts 12d, 13d match each other in the Y-axis direction. In the present embodiment, the storing cutouts 12c, 13c and the receiving cutouts 12d, 13d are formed on both sides in the X-axis direction in such a manner that the four machine tools 1 to 4 can fit in between the cutouts. The gap D (FIG. 3) in the X-axis direction between the storing cutouts 12c, 13c and the receiving cutouts 12d, 13d is an integer multiple of the pitch P between the machine tools 1 to 4. In the embodiment illustrated herein, where four machine tools 1 to 4 are used, the gap D is five times the pitch P (FIG. 6). The first and second air cylinders 21, 22 are disposed opposing the storing cutouts 12c, 13c and the receiving cutouts 12d, 13d, and are provided on the far side of the machine tools 1 to 4 in such a manner so as to match a respective center axis that runs through the cutouts in the Y-axis direction.

Figure 8:
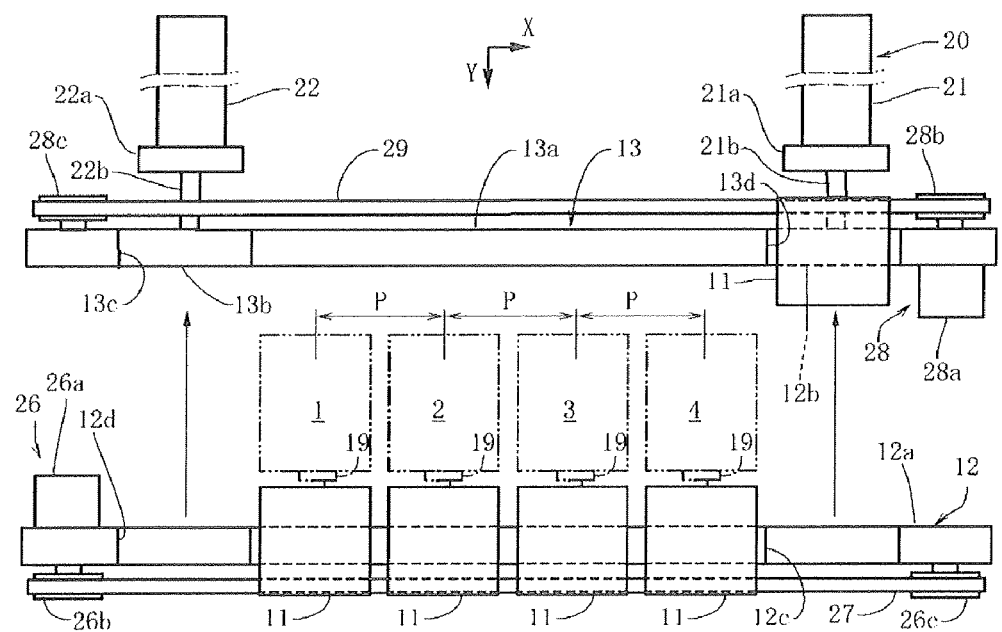
FIG. 8 is a top-view diagram illustrating a state after transfer of the pallet to the second pallet rail, and before conveyance of the pallet along the second pallet rail.

Specifically, as illustrated in FIG. 1 and FIG. 6, the first and second air cylinders 21, 22 are attached to the base 9 by way of mounting pieces 21a, 22a. The first and second air cylinders 21, 22 are provided with respective projectable and retractable rods 21b, 22b that are retractable in the Y-axis direction. The first and second movable portions 12b, 13b that form part of the first pallet rail 12 and second pallet rail 13 that occupy the storing cutouts 12c, 13c are respectively attached to the leading ends of the rods 21b, 22b of the first and second air cylinders 21, 22. The first movable portion 12b occupies the storing cutout 12c of the first pallet rail 12 in a state where the rod 21b of the first air cylinder 21 supports the first movable portion 12b. When the rod 21b is in a retracted state, the first movable portion 12b occupies the receiving cutout 13d of the second pallet rail 13, as illustrated in FIG. 8. When the rod 22b of the second air cylinder 22 that supports the second movable portion 13b is in a retracted state, the second movable portion 13b occupies the storing cutout 13c of the second pallet rail 13. When the rod 22b is in a projected state, the second movable portion 13b occupies the receiving cutout 12d of the first pallet rail 12, as illustrated in FIG. 6.

Figure 7:
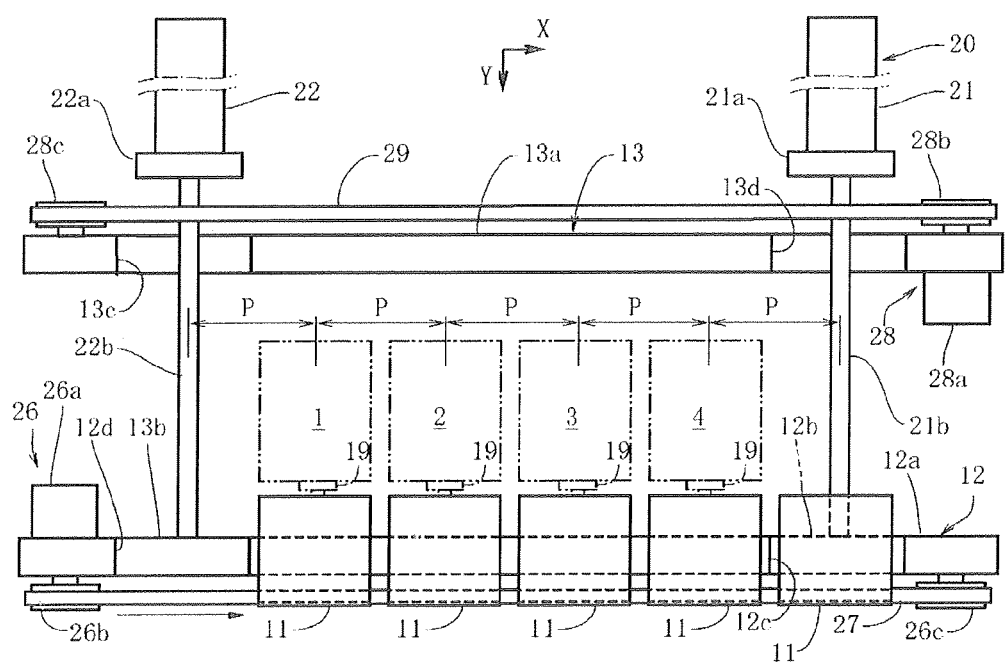
FIG. 7 is a top-view diagram illustrating a state after conveyance of the pallet along the first pallet rail, and before transfer of the pallet to the second pallet rail.
Figure 9:
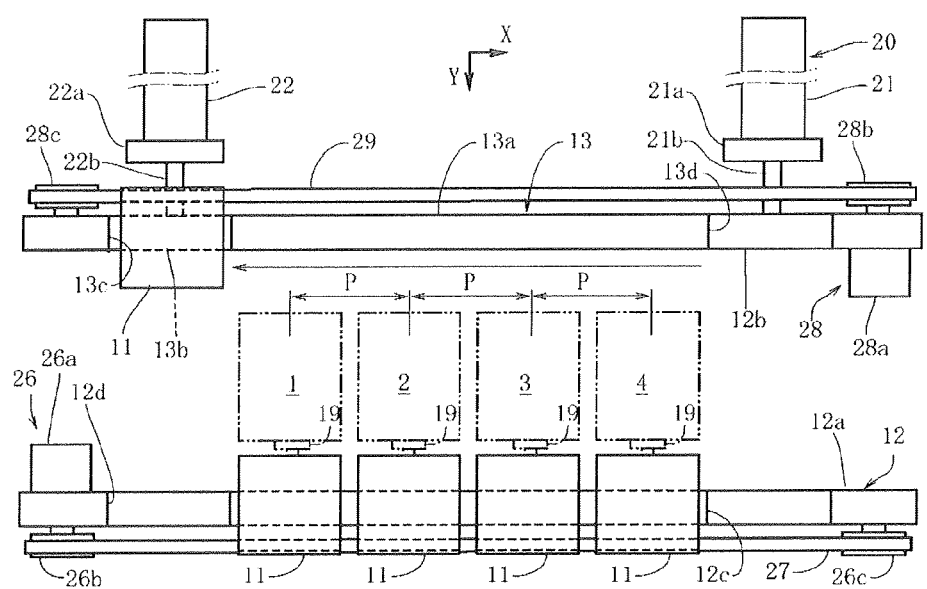
FIG. 9 is a top-view diagram illustrating a state after conveyance of the pallet along the second pallet rail, and before transfer of the pallet to the first pallet rail.

In the pallet transfer mechanism 20, therefore, a pallet 11 is transferred from the fixed portion 12a, which is another part of the first pallet rail 12, to the first movable portion 12b that occupies the storing cutout 12c of the first pallet rail 12, so that the pallet 11 is loaded on the first movable portion 12b, as illustrated in FIGS. 6 and 7. The first air cylinder 21 causes then the rod 21b thereof to retract, whereby the pallet 11 that is loaded on the first movable portion 12b, which is one part of the first pallet rail 12, can move in the Y-axis direction together with the movable portion 12b, as illustrated in FIG. 8. In a state where the receiving cutout 13d of the second pallet rail 13 is occupied by the first movable portion 12b, the latter is continuous to the fixed portion 13a of the second pallet rail 13, so that the pallet 11 can be transferred to the fixed portion 13a. Contrariwise, as illustrated in FIG. 8 and FIG. 9, the pallet 11 is transferred from the fixed portion 13a, which is another part of the second pallet rail 13, to the second movable portion 13b that occupies the storing cutout 13c of the second pallet rail 13, so that the pallet 11 is loaded on the second movable portion 13b. As illustrated in FIG. 6, the second air cylinder 22 causes then the rod 22b thereof to protrude, whereby the pallet 11 that is loaded on the second movable portion 13b that makes one part of the second pallet rail 13 can move in the Y-axis direction together with the movable portion 13b. In a state where the receiving cutout 12d of the first pallet rail 12 is occupied by the second movable portion 13b, the latter is continuous to the fixed portion 12a of the first pallet rail 12, so that the pallet 11 can be transferred to the fixed portion 12a.

Figure 3:
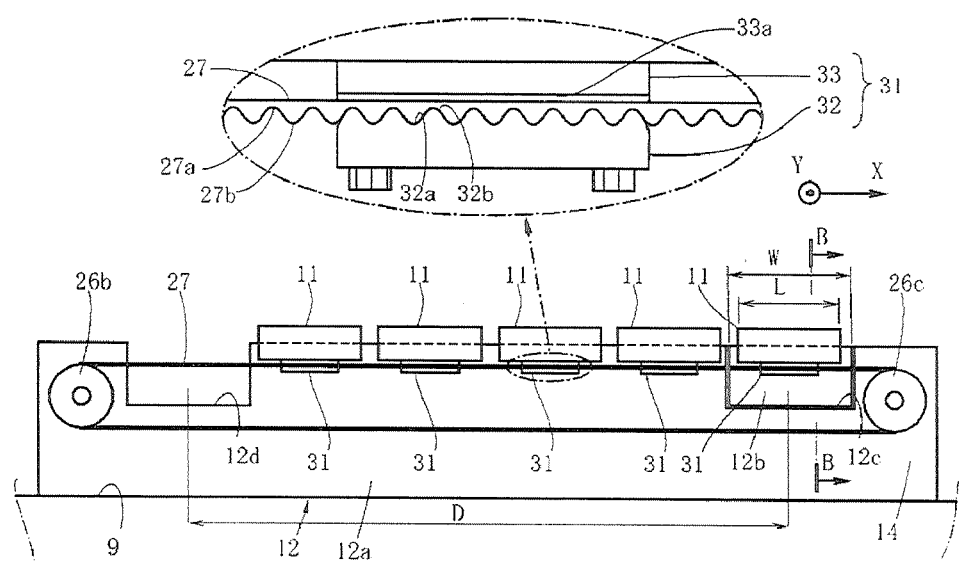
FIG. 3 is a front-view diagram of a first pallet rail in the conveying apparatus.

Returning now to FIG. 1, the pallet conveying apparatus 10 is provided with a first pallet feeding mechanism 26 and a second pallet feeding mechanism 28 that convey the pallets 11 along the first pallet rail 12 and the second pallet rail 13. The first pallet feeding mechanism 26 and the second pallet feeding mechanism 28 have the same structure. The first pallet feeding mechanism 26 and the second pallet feeding mechanism 28 comprise respective endless first and second belts 27, 29 that can engage with the pallets 11, and that are provided so as to circulate along the first pallet rail 12 and the second pallet rail 13; and circulation mechanisms 26a, 28a that cause the belts 27, 29 to circulate. In an explanation of a typical example of the first pallet feeding mechanism, as shown in FIG. 3 the two ends of the first belt 27 are spanned between a driving pulley 26b and a driven pulley 26c. In the instance illustrated in the figure, the driving pulley 26b and the driven pulley 26c are provided on both sides, in the X-axis direction, of the support plate 14 in the first pallet rail 12. As illustrated in FIG. 6, a servomotor 26a, as a circulation mechanism, is provided on the support plate 14, so that the driving pulley 26b is attached to the rotating shaft of the servomotor 26a. The servomotor 26a is driven as a result of an instruction from a controller, not shown, whereupon the driving pulley 26b rotates together with the rotating shaft of the servomotor 26a. The first belt 27 wrapped around the driving pulley 26b circulates between the driving pulley 26b and the driven pulley 26c. In the example of the figure, the servomotor 26a is used as the circulation mechanism, and the driving pulley 26b and the driven pulley 26c are provided on the support plate 14. However, the driving pulley and the driven pulley may be provided at portions other than the support plate 14. An air cylinder, hydraulic cylinder or the like may also be used instead of the servomotor.

The first and second belts 27, 29 are so-called toothed belts. The belts 27, 29 have the same structure, and hence the first belt 27 will be explained as a representative example of the belts. As illustrated in the enlarged diagram of FIG. 3, the toothed first belt 27 has recesses/projections 27a, 27b extending in the width direction and alternately continuous in the longitudinal direction. Counter-recesses/projections 32a, 32b that can interlock with the recesses/projections 27a, 27b are formed in the pallets 11. The counter-recesses/projections 32a, 32b are formed in the locking members 31 of the pallets 11. As illustrated in FIG. 2, the locking members 31 are provided below the seat 11b, such that the locking members 31 flank the rail 12 from both sides of the latter. One of the locking members 31 provided on both sides of the first pallet rail 12 locks the first belt 27 and the other locks the second belt 29. The locking members 31 provided on both sides have each locking pieces 32 on which there are formed the counter-recesses/projections 32a, 32b, and pressing pieces 33 that oppose the locking pieces 32, with a predetermined gap in between, in such a manner that the first belt 27 is clamped between a pressing piece 33 and a locking piece 32. As the belt 27 enters between the locking piece 32 and the pressing piece 33 in the Y-axis direction, the recesses/projections 27a, 27b formed in the belt 27 engage with the counter-recesses/projections 32a, 32b of the locking piece 32. The pressing piece 33 is configured in such a manner so as to prevent the belt 27 from hovering off the locking piece 32, i.e. to prevent the recesses/projections 27a, 27b from disengaging from the counter-recesses/projections 32a, 32b. FIG. 2 illustrates the first belt 27 engaged to one of the locking members 31. An inclined portion 33a for facilitating entry of the belt 27 is formed at the edge of the pressing piece 33 over which the belt 27 enters.

As illustrated in FIG. 3, motion independent from the belt 27 in the X-axis direction is restricted for the pallet 11 when the counter-recesses/projections 32a, 32b in the pallet 11 engage with the recesses/projections 27a, 27b of the belt 27. As a result, the pallet 11 moves together with the belt 27 when the latter circulates with the pallet 11 engaged thereto. The pallet 11 is conveyed thus along the first or second pallet rail 12, 13, along which the belt 27 is stretched.

Figure 4:
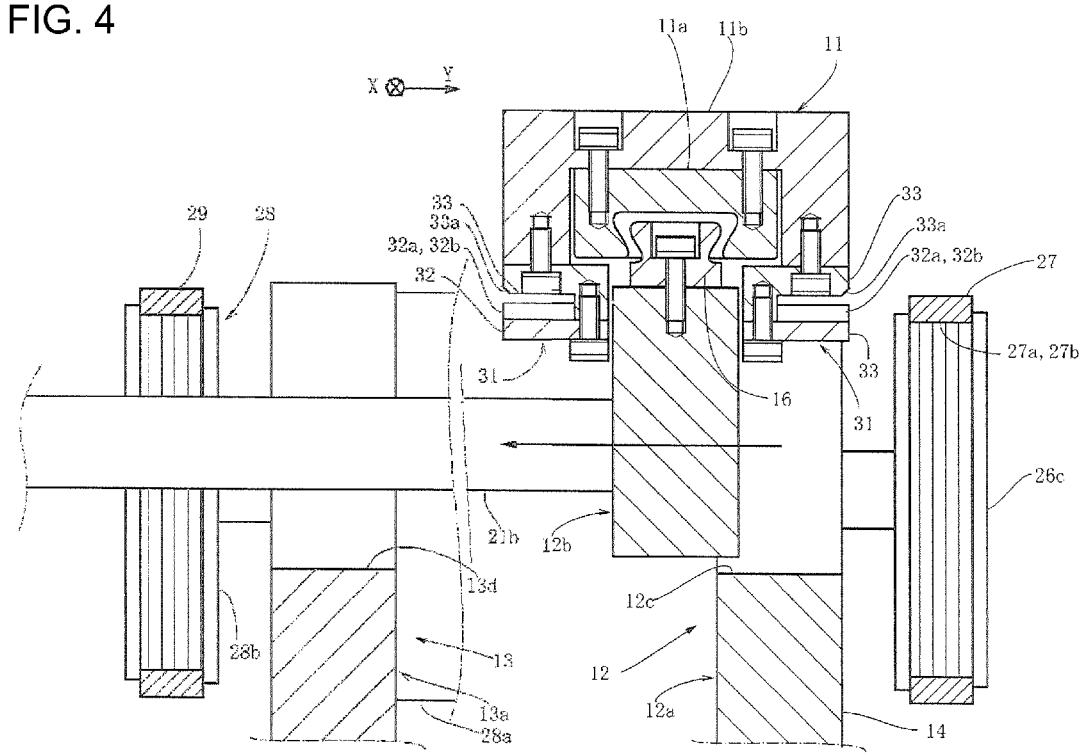
FIG. 4 is a cross-sectional diagram of FIG. 3, along line B-B, illustrating a state in which a first movable portion is being transferred.
Figure 5:
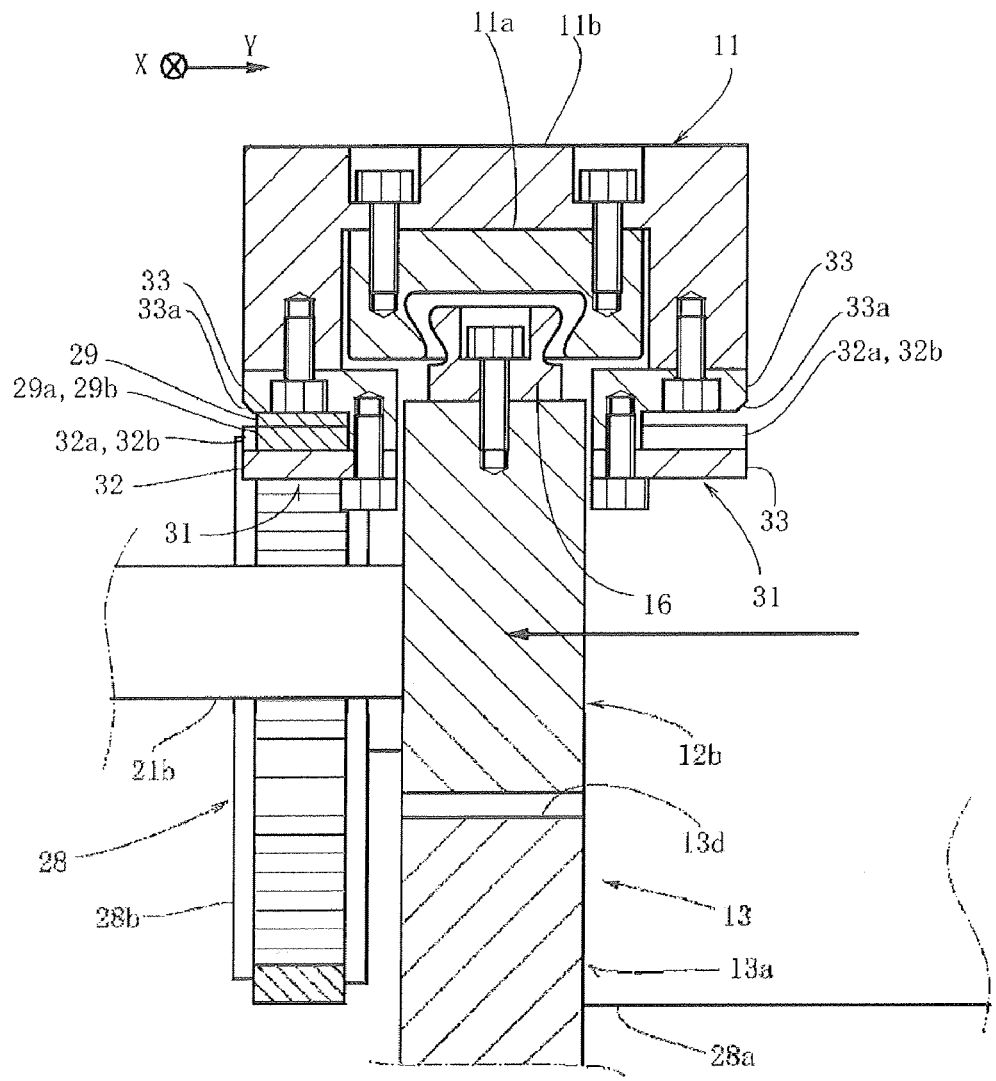
FIG. 5 is a cross-sectional diagram, corresponding to FIG. 4, illustrating a state where the first movable portion has been transferred and arrives at a second pallet rail.

The recesses/projections 27a, 27b of the belt 27 and the counter-recesses/projections 32a, 32b in the pallet 11 are formed so as to extend in the width direction, i.e. the Y-axis direction. Therefore, when the pallet 11 is transferred in the Y-axis direction, as indicated by the solid arrow of FIG. 4, the counter-recesses/projections 32a, 32b in one locking member 31 of the pallet 11 disengage from the recesses/projections 27a, 27b of the first belt 27, which does not move in the Y-axis direction, and move off the first belt 27 in the Y-axis direction. The pallet 11 is released thereby from the state in which it was engaged with the first belt 27. The pallet 11 moves further in the Y-axis direction together with the first movable portion 12b, and approaches the second pallet rail 13. Upon reaching a state in which the first movable portion 12b occupies the receiving cutout 13d of the second pallet rail 13, as illustrated in FIG. 5, the first movable portion 12b forms a straight line with the second pallet rail 13, and the other locking member 31 in the pallet 11 engages now with the second belt 29 that is provided along the second pallet rail 13.

In the pallet conveying apparatus 10, thus the pallet 11 disengages from the first or second belt 27, 29 when the first or second movable portion 12b, 13b of the first or second pallet rail 12, 13, on which the pallet 11 is loaded, moves away from the other parts. The first or second movable portion 12b, 13b, having moved away from other parts, travels in the Y-axis direction, occupies the receiving cutout 12d, 13d, and forms a straight line with the second or first pallet rail 13, 12, whereupon the pallet 11 engages anew with the second or first belt 29, 27 that is provided along the second or first pallet rail 13, 12.

A pallet conveyance method of the present invention, in which the above-described pallet conveying apparatus is used, is explained next.

The pallet conveyance method according to the present invention comprises a first pallet conveying step of conveying a pallet 11 loaded on the first pallet rail 12; a first pallet transfer step of causing the portion of the first pallet rail 12 on which the pallet 11 is loaded to separate from another part, and causing the pallet 11 loaded on the separated movable portion 12b to be transferred to the second pallet rail 13; a second pallet conveying step of conveying the pallet 11 loaded on the second pallet rail 13; and a second pallet transfer step of causing the part of the second pallet rail 13 on which the pallet 11 is loaded to separate from another part, and causing the pallet 11 loaded on the separated movable portion 13b to be transferred to the first pallet rail 12.

First Pallet Conveying Step

In the first pallet conveying step, the pallet 11 loaded on the first pallet rail 12 is conveyed. To that end, the first movable portion 12b is accommodated in the first storing cutout 12c, without the pallet 11 being yet loaded on the first movable portion 12b, as illustrated in FIG. 6. A pallet 11 is loaded on the second movable portion 13b, and the second movable portion 13b is received in the first receiving cutout 12d. Thereupon, the counter-recesses/projections 32a, 32b provided in the pallet 11 that is loaded on the second movable portion 13b and in the pallet 11 that is loaded on the fixed portion 12a of the first pallet rail 12, which is another part, engage with the recesses/projections 27a, 27b of the first belt 27 that is provided along the first pallet rail 12. The belt 27 is caused to circulate by the servomotor 26a as a driving mechanism, whereupon the above pallets 11 are conveyed along the first pallet rail 12. In this conveyance, as illustrated in FIG. 7, the leading pallet 11 is loaded on the first movable portion 12b. The servomotor 26a stops with the other four pallets 11 facing respective machine tools 1 to 4. Conveyance of the pallets 11 is thus stopped.

First Pallet Transfer Step

The first movable portion 12b, which is the portion of the first pallet rail 12 on which the pallet 11 is loaded, separates from the fixed portion 12a, which is another part, and the pallet 11 loaded on the first movable portion 12b is transferred thereby to the second pallet rail 13. Specifically, transitioning from the state in FIG. 7 the first movable portion 12b is caused to separate from the fixed portion 12a, which is another part, that occupies the storing cutout 12c of the first pallet rail 12, through retraction of the rod 21b by the first air cylinder 21. The pallet 11 and the belt 27 disengage then from each other, as illustrated in FIG. 4, as the first movable portion 12b of the first pallet rail 12 and on which the pallet 11 is loaded separates from the other part 12a. Therefore, the first movable portion 12b can move without hindrance. As illustrated in FIGS. 5 and 8, the pallet 11 loaded on the first movable portion 12b moves along the Y-axis direction together with the first movable portion 12b. Retraction of the rod 21b stops when the receiving cutout 13d of the second pallet rail 13 is occupied by the first movable portion 12b.

Preferably, the second movable portion 13b that occupies the receiving cutout 12d of the first pallet rail 12 is caused to move in the Y-axis direction and to return to the storing cutout 13c of the second pallet rail 13, through retraction of the rod 22b by the second air cylinder 22.

Second Pallet Conveying Step

In the second pallet conveying step, the pallet 11 loaded on the second pallet rail 13 is conveyed. In this step, specifically, the first movable portion 12b forms a straight line with the second pallet rail 13, in the state illustrated in FIG. 8, where the first movable portion 12b occupies the receiving cutout 13d of the second pallet rail 13. As illustrated in FIG. 5, the pallet 11 becomes engaged now with the second belt 29 that is provided along the second pallet rail 13. The second belt 29 circulates then through driving by the servomotor 28a, as a driving mechanism, and the pallet 11 loaded on the first movable portion 12b is transferred to the fixed portion 13a of the second pallet rail 13. The second movable portion 13b is returned to the storing cutout 13c of the second pallet rail 13. Thereby, the pallet 11, transferred and loaded onto the fixed portion 13a of the second pallet rail 13, can be transferred and loaded onto the second movable portion 13b, as illustrated in FIG. 9.

Second Pallet Transfer Step

The second movable portion 13b, which is the portion of the second pallet rail 13 on which the pallet 11 is loaded, separates from the fixed portion 13a, which is another part, and the pallet 11 loaded on the movable portion 13b is transferred to the first pallet rail 12. Starting from the state illustrated in FIG. 9, the second air cylinder 22 causes then the rod 22b thereof to protrude, whereby the second movable portion 13b that occupies the storing cutout 13c of the second pallet rail 13 separates from the fixed portion 13a, which is another part, as illustrated in FIG. 6. The pallet 11 and the second belt 29 become then disengaged from each other as the movable portion 13b of the second pallet rail 13 and on which the pallet 11 is loaded separates from the other part 13a. Therefore, the second movable portion 13b can move without hindrance. As illustrated in FIG. 6, the pallet 11 loaded on the second movable portion 13b occupies, together with the second movable portion 13b, the receiving cutout 12d of the first pallet rail 12. At the point in time in which the second movable portion 13b is received in the receiving cutout 12d of the first pallet rail 12, the second movable portion 13b forms a straight line with the fixed portion 12a of the first pallet rail 12, and the pallet 11 becomes engaged now with the belt 27 provided along the first pallet rail 12.

Preferably, the first movable portion 12b that occupies the receiving cutout 13d of the second pallet rail 13 is caused to move in the Y-axis direction and to return to the storing cutout 12c of the first pallet rail 12, through retraction of the rod 21b by the first air cylinder 21.

The pallets 11 can be conveyed one by one, in the counterclockwise direction, by completing one cycle from FIG. 6 to FIG. 9. The operation of the pallet conveying apparatus 10 stops once each cycle from FIGS. 6 to 9 is completed. The machine tools 1 to 4 are operated then, with the pallet conveying apparatus 10 in a stopped state. The machine tools 1 to 4 carry out in parallel various processes that include, for instance, insertion of insulating members, crimping of lead wires of coils of respective phases, welding and so forth, and that are performed on works, not shown, carried on respective pallets 11 that are arrayed on the first pallet rail 12. The pallet motion locking mechanism 17 locks the motion of the pallets 11 arrayed on the first pallet rail 12 during operation of the machine tools 1 to 4, so that the works are held at predetermined positions via respective pallets 11. While the machine tools 1 to 4 are in operation, works are loaded to and unloaded from the pallets 11 on the second pallet rail 13.

In the pallet conveying apparatus and pallet conveyance method having the above features, each pallet 11 is engaged with the first and second belts 27, 29 that are provided along the first pallet rail 12 and the second pallet rail 13, and moves while loaded on the first pallet rail 12 and the second pallet rail 13. Therefore, the pallets can be conveyed quickly and stopped at predetermined positions, even in case of heavy works. Productivity is enhanced as a result. The pallets 11 can be positioned with high precision thanks to the pallet motion locking mechanism 17 that locks the motion of the pallets 11 with respect to the first pallet rail 12. The processing precision of the machine tools 1 to 4 is likewise enhanced, which results in higher-quality products.

In the pallet conveying apparatus 10 and pallet conveyance method, the pallets 11 are engaged with the endless circulating belts 27, 29, whereby the pallets 11 are conveyed along the first pallet rail 12 and the second pallet rail 13. Therefore, modifying the position at which the pallets 11 engage with the belts 27, 29 allows modifying easily the conveyance pitch with respect to a pallet 11 ahead, i.e. the spacing with respect to a pallet 11 that has engaged previously with the belt 27, 29 and has been conveyed along the first pallet rail 12 or the second pallet rail 13. As a result, the pitch can be modified quickly, without changes in the pallets 11 themselves, in response to changes in the pitch at which the works are conveyed. Such pitch changes may be required on account of, for instance, modifications in the machine tools 1 to 4 or in the works to be processed.

In the embodiment explained above, the pallets 11 circulate along a track in the counterclockwise direction, but are not limited thereto, and may be conveyed in a clockwise direction.

In the above-described embodiment, the first pallet rail 12 and the second pallet rail 13 are disposed so as to flank the machine tools 1 to 4 from both sides of the latter in the Y-axis direction. However, the machine tools 1 to 4 may also be provided outside the first pallet rail 12 and the second pallet rail 13, and not in between.

In the example explained in the above embodiment, the driving pulleys 26b, 28b and the driven pulleys 26c, 28c are provided on both sides, in the X-axis direction, of the support plates 14 of the first and second pallet rails 12, 13, and the driving pulleys 26b, 28b and the driven pulleys 26c, 28c are respectively wrapped around both ends of the first and second belts 27, 29, which comprise each a single toothed belt. However, it may be difficult for a single belt to stretch over the entire length of the first or second pallet rail 12, 13 in a case where the rail 12, 13 deviates from the dimensional specifications of belt 27, 29 and is comparatively longer than the belt. In such cases, the first and second belts 27, 29 that stretch over long rails may comprise a pair of endless toothed short belts that circulate along the rails.

Figure 10:
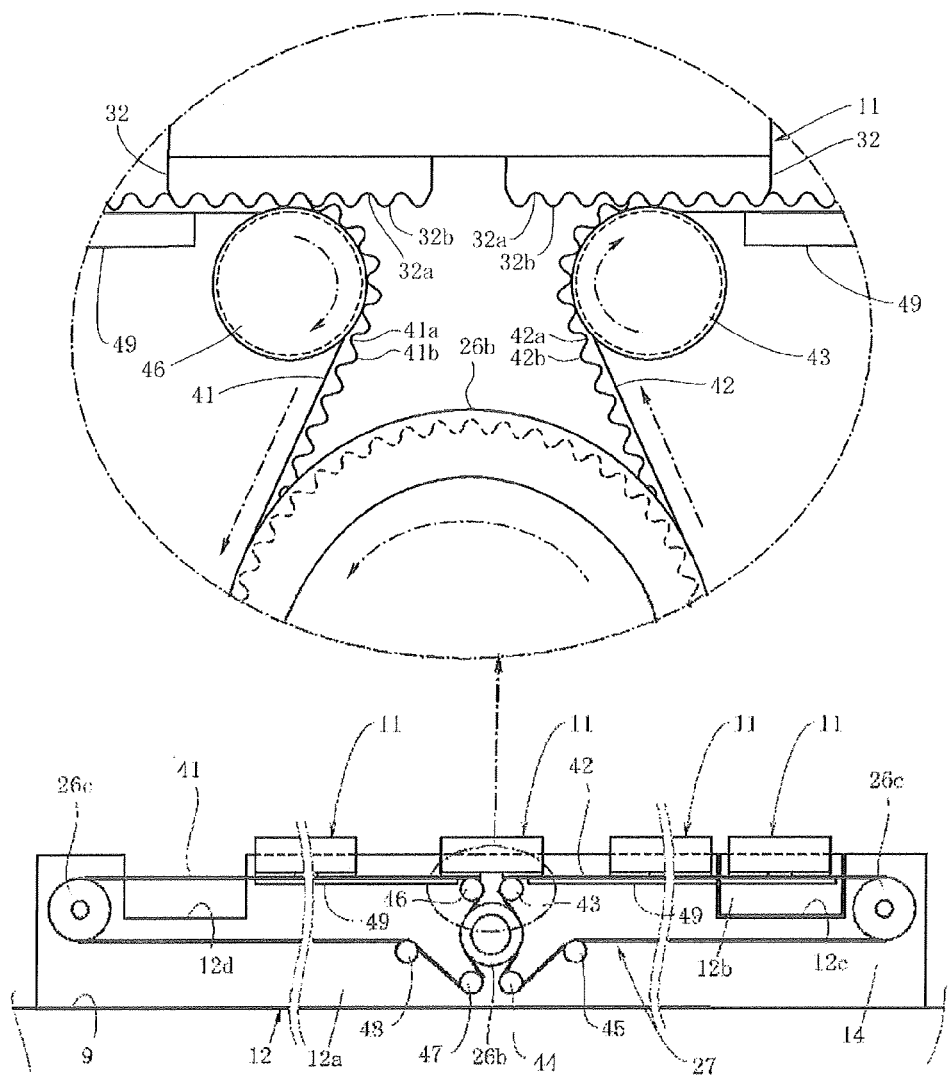
FIG. 10 is a front-view diagram, corresponding to FIG. 3, illustrating another pallet feeding mechanism.

An explanation follows next on a representative example of the above configuration in the first belt 27 that stretches along the first pallet rail 12. In a case where there is used a first belt 27 comprising a pair of toothed short belts 41, 42, a single driving pulley 26b, on which the pair of short belts 41, 42 is wrapped, is provided in substantially the center, or the vicinity thereof, of the support plate 14 of the first pallet rail 12, in the X-axis direction, as illustrated in FIG. 10. The short belts 41, 42 wrapped on the single driving pulley 26b form a pair, and hence there is provided a plurality of auxiliary pulleys 43 to 48 for looping the respective pair of short belts 41, 42, from both ends in the X-axis direction. In the present embodiment, three auxiliary pulleys are provided at each side of the driving pulley 26b, in the X-axis direction. The plurality of auxiliary pulleys 43 to 48 causes the pair of short belts 41, 42 to be looped pressing against the driving pulley 26b, from both sides in the X-axis direction.

The driven pulleys 26c, 26c that respectively support the pair of short belts 41, 42 are provided on both sides, in the X-axis direction, of the support plate 14 of the first pallet rail 12. The pair of short belts 41, 42 wrapped on the driving pulley 26b at the center of support plate 14 stretch to both sides of the support plate 14, where the ends of the short belts 41, 42 are supported. The pair of short belts 41, 42, pressed against and wrapped on the driving pulley 26b, from both sides of the latter, becomes linked in the X-axis direction as a result. A linked pair of short belts 41, 42 is provided thus along the entire length of the first pallet rail 12. The reference numeral 49 in FIG. 10 denotes a support member 49 provided in the support plate 14 for preventing the short belts 41, 42 from sagging, and for preventing thereby that the recesses/projections 41a, 42b, 42a, 42b of the short belts 41, 42 should disengage from the counter-recesses/projections 32a, 32b of the pallet 11 due to sagging of the short belts 41, 42.

Thus, even if one or both of the first and second belts 27, 29 comprises a pair of toothed short belts 41, 42, the counter-recesses/projections 32a, 32b of the pallet 11 engage with the recesses/projections 41a, 42b, 42a, 42b in the short belts 41, 42, whereby the pallet 11 can be conveyed along the first or second pallet rail 12, 13 through circulation of the short belts 41, 42. The pallet 11 can then disengage from the short belts 41, 42 when the movable portions 12b, 13b of the rails 12, 13 separate from the other parts 12a, 13a. Thus, linking of the short belts 41, 42 allows a belt to stretch over the entire length of the pallet rails 12, 13, even when the first or second pallet rail 12, 13 deviates from the dimensional specifications of ordinary belts and is comparatively longer than the belts. By being thus wrapped on the single driving pulley 26b, the pair of short belts 41, 42 can be caused to circulate at the same speed by the servomotor 26a, as a single driving mechanism. This makes it unnecessary to provide an independent, new driving mechanism. The structure of the driving mechanism can be prevented thus from being overly complex.

Figure 11:
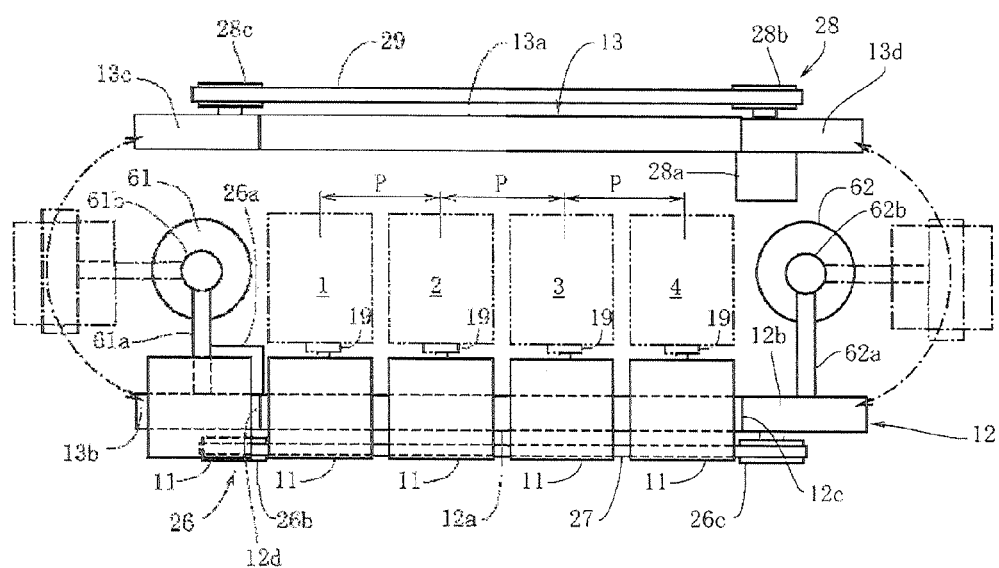
FIG. 11 is a front-view diagram, corresponding to FIG. 6, illustrating another pallet feeding mechanism.

The pallet transfer mechanism 20 of the embodiment as explained above is provided with the first and second air cylinders 21, 22 that support the movable portions 12b, 13b individually, such that the movable portions 12b, 13b move linearly through projection and retraction of the rods 21b, 22b of the first and second air cylinders 21, 22. However, the motion of the movable portions 12b, 13b is not limited to a linear motion, so long as the movable portions 12b, 13b move together with the pallets 11 that are loaded thereon. As illustrated in FIG. 11, for instance, servomotors 61, 62 may be provided between the storing cutouts 12c, 13c and the receiving cutouts 12d, 13d, so as to flank the four machine tools 1 to 4 in the X-axis direction, the bases of pivot shafts 61a, 62a may be perpendicularly fixed to the rotating shafts 61b, 62b of the servomotors 61, 62, and the movable portions 12b, 13b may be attached to the leading ends of the pivot shafts 61a, 62a. Also in the case where the movable portions 12b, 13b are attached to the leading ends of the pivot shafts 61a, 62a, the pivot shafts 61a, 62a pivot each as indicated by the dot-dashed arrow, as a result of which the movable portions 12b, 13b that occupy the storing cutouts 12c, 13c move to the receiving cutout 13d, 12d at the other rail, by pivoting in a semicircle. Similarly, the movable portions 12b, 13b that occupy the receiving cutouts 13d, 12d of the other rail can move back to the storing cutouts 12c, 13c of the original rail, by pivoting in a semicircle. So long as they can pivot, the pivot shafts 61a, 62a in FIG. 11, may be configured to be pivotable by way of an air cylinder or hydraulic cylinder, instead of the servomotors 61, 62.

The invention claimed is:

1. A pallet conveying apparatus, comprising:
one, two or more pallets onto which a work can be loaded; a first pallet rail and a second pallet rail onto which the pallet can be movably loaded; a first pallet feeding mechanism and a second pallet feeding mechanism that convey the pallet along the first pallet rail and the second pallet rail; and a pallet transfer mechanism that causes the pallet loaded on the first pallet rail or the second pallet rail to be transferred to the second pallet rail or the first pallet rail, wherein
the first pallet feeding mechanism has an endless first belt that is capable of engaging with the pallet that is loaded on the first pallet rail, and circulates along the first pallet rail,
the second pallet feeding mechanism has an endless second belt that is capable of engaging with the pallet that is loaded on the second pallet rail, and circulates along the second pallet rail; and
the pallet transfer mechanism having a first movable portion that forms one part of the first pallet rail and that can be made continuous with the second pallet rail by moving away from another part of the first pallet rail, and a second movable portion that forms one part of the second pallet rail and that can be made continuous with the first pallet rail by moving away from another part of the second pallet rail;
wherein:
the first and second belts are toothed belts having recesses/projections extending in a width direction and alternately continuous in a longitudinal direction,
counter-recesses/projections capable of engaging with the recesses/projections are formed in the pallet,
the pallet is conveyed along the first or second pallet rail by circulating the belt, with the counter-recesses/projections being engaged with the recesses/projections; and
the pallet disengages from the first or second belt when the first or second movable portion of the first or second pallet rail, on which the pallet is loaded, moves away from another part.

2. The pallet conveying apparatus according to claim 1, wherein
one or both of the first and second belts comprises a pair of endless circulating toothed short belts,
the pair of toothed short belts has a single driving pulley on which each of the toothed short belts is wrapped; and
the pair of toothed short belts can circulate through rotation of the single driving pulley.

3. A pallet conveyance method, comprising:
a first pallet conveying step of conveying a pallet along a first pallet rail;
a first pallet transfer step of separating one part of the first pallet rail onto which the pallet is loaded from another part, and transferring the pallet to a second pallet rail;
a second pallet conveying step of conveying the pallet along the second pallet rail; and
a second pallet transfer step of separating one part of the second pallet rail onto which the pallet is loaded from another part, and transferring the pallet to the first pallet rail, wherein
in the first pallet conveying step and the second pallet conveying step, the pallet is conveyed by engaging the pallet with an endless belt that circulates along the first pallet rail and the second pallet rail; and in the first pallet transfer step and the second pallet transfer step, the pallet, loaded on one part of the first pallet rail or the second pallet rail, is disengaged from the belt upon separation of the one part from another part.

* * * * *